(12) United States Patent
Balogh et al.

(10) Patent No.: US 11,269,039 B2
(45) Date of Patent: Mar. 8, 2022

(54) METHOD AND SYSTEM FOR TRANSCEIVER CALIBRATION

(71) Applicant: Pozi Development Kft., Szekesfehervar (HU)

(72) Inventors: Andras Balogh, Budapest (HU); Karoly Lendvai, Keszthely (HU); Sandor Szabo, Budapest (HU); Kristof Attila Horvath, Budapest (HU); Gergely Ill, Tapioszecso (HU); Akos Milankovich, Gyomro (HU)

(73) Assignee: Pozi Development Kft.

( * ) Notice: Subject to any disclaimer, the term of this patent is extended or adjusted under 35 U.S.C. 154(b) by 50 days.

(21) Appl. No.: 16/645,921

(22) PCT Filed: Sep. 11, 2018

(86) PCT No.: PCT/HU2018/050038
§ 371 (c)(1),
(2) Date: Mar. 10, 2020

(87) PCT Pub. No.: WO2019/058150
PCT Pub. Date: Mar. 28, 2019

(65) Prior Publication Data
US 2020/0278415 A1 Sep. 3, 2020

(30) Foreign Application Priority Data

Sep. 11, 2017 (HU) .................................... P1700379

(51) Int. Cl.
*G01S 1/02* (2010.01)
*H04B 17/11* (2015.01)
*H04B 17/21* (2015.01)
*G01S 1/20* (2006.01)

(52) U.S. Cl.
CPC ................ *G01S 1/022* (2013.01); *G01S 1/20* (2013.01); *H04B 17/11* (2015.01); *H04B 17/21* (2015.01)

(58) Field of Classification Search
CPC ........... G01S 1/022; G01S 1/20; H04B 17/11; H04B 17/21
See application file for complete search history.

(56) References Cited

U.S. PATENT DOCUMENTS

| | | | |
|---|---|---|---|
| 2003/0034887 A1* | 2/2003 | Crabtree | G01S 13/84 340/539.1 |
| 2005/0129139 A1* | 6/2005 | Jones | G01S 5/14 375/295 |
| 2016/0259032 A1* | 9/2016 | Hehn | G01S 5/0289 |

* cited by examiner

*Primary Examiner* — Duc C Ho
(74) *Attorney, Agent, or Firm* — Olson & Cepuritis, Ltd.

(57) ABSTRACT

Position of a transceiver is calibrated using a pair of calibration devices spaced from the transceiver and each other. A calibration wave signal is emitted from one of the calibration devices and detected by the transceiver as well as the other calibration device. The transceiver generates a response wave signal upon receipt of the calibration wave signal which response wave signal is detected by one of the calibration devices. A delay constant for use in distance determination between transceivers is calculated based on the sum of detected transmission and receipt time intervals and the propagation speed of the wave signals.

8 Claims, 3 Drawing Sheets

METHOD AND SYSTEM FOR TRANSCEIVER CALIBRATION

CROSS-REFERENCE TO RELATED APPLICATIONS

Figure 1:
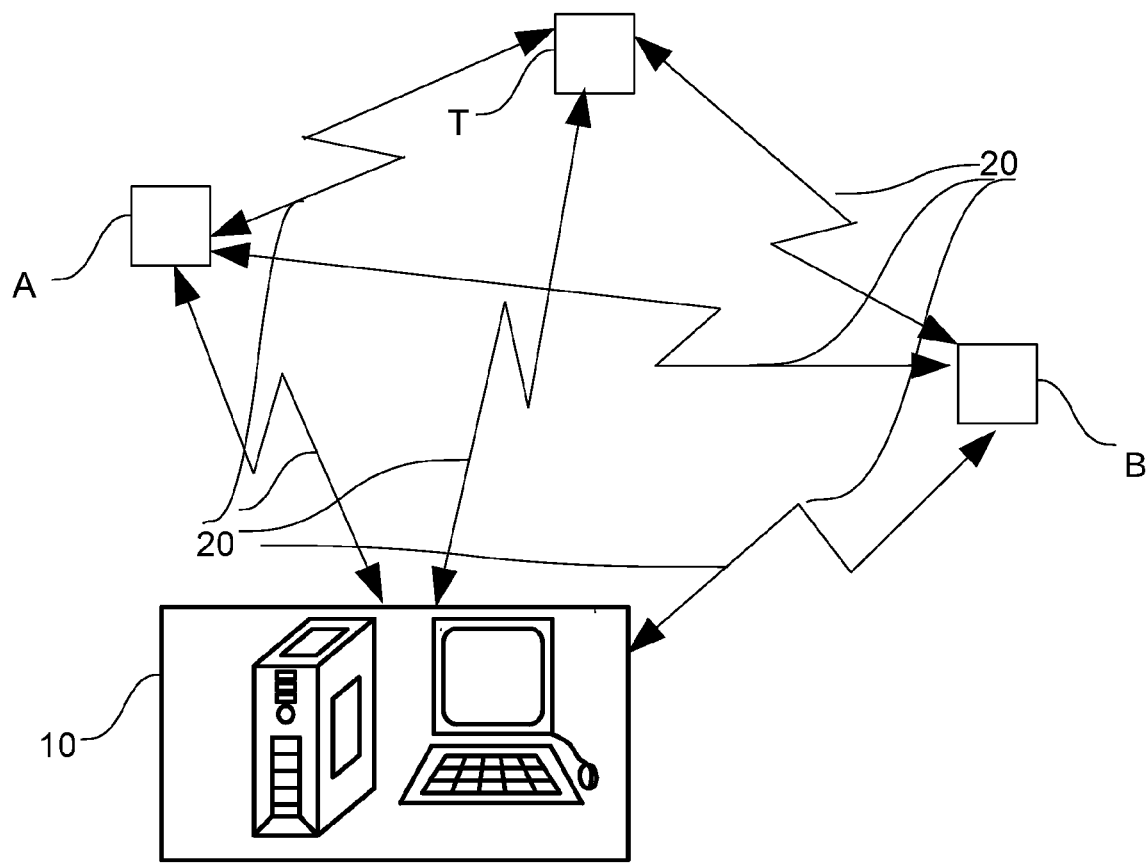

This application is a U.S. National Stage of PCT/HU2018/050038, filed Sep. 11, 2018, which claims priority of Hungarian Patent Application No. P1700379, filed Sep. 11, 2017, each of which is incorporated herein by reference.

The object of the invention relates to a method for the calibration of a transceiver device suitable for generating, emitting and detecting electromagnetic wave signals.

The object of the invention also relates to a system for the calibration of a transceiver device suitable for generating, emitting and detecting electromagnetic wave signals, which system contains a first calibration device suitable for generating and emitting electromagnetic wave signals arranged at a distance D1 from the transceiver device, and a second calibration device suitable for detecting electromagnetic wave signals arranged at a distance D2 from the transceiver device and at a distance D from the first calibration device.

As a result of the development of communications technology numerous systems have been developed that are capable of determining the position of an object (e.g. mobile telephone) in one way or another. In the case of one possible method of interior positioning the position of an object is determined by measuring the propagation time of electromagnetic waves, preferably radio waves.

A known method of signal propagation time based distance measuring with radio waves is the sending of messages there and back (two-way ranging) with the use of wave signals. A first and a second transceiver device are required for the distance measuring method also appearing in the IEEE 802.15.4a standard. The first transceiver device sends a query wave signal package to the second transceiver device, which it responds to with a response signal package. The time difference between the sending of the response signal package and the receipt (or detection) of the query signal package is contained optionally in the response signal package or preferably in a signal package sent after the response signal package is sent. The time difference between the sending of the query signal package and the arrival of the response signal package is measured by the first transceiver device. On the basis of this the first transceiver device calculates the joint propagation time of the two packages. In the knowledge of the speed of propagation of radio waves, the distance between the two transceiver devices can be calculated from the joint propagation time of the packages.

It is necessary to measure time with great precision in order to successfully use the method. As the speed of propagation of radio waves is the same as the speed of light, the times must be measured with nanosecond (ns) or sub-nanosecond precision in the interest of obtaining suitable positioning precision. The precision of the there and back message-sending method is fundamentally determined by the error in the measurement of the time difference between the receipt of the query signal package and the sending of the response signal package, which, measured on the nanosecond scale, is high. This is why the above method only makes it possible to perform low-precision distance measuring, and so is rarely used in practice.

The error originating from the imprecision of time measurement may be reduced by not determining the distance between the transceiver devices with a single there-and-back exchange of packages, instead it is determined using several time intervals, in this way the error in measuring time causes a smaller error in the final result. The essence of this method is that after the first exchange of messages the first transceiver device sends a response signal package to the second transceiver device, so both devices measure two time intervals each (three-message exchange method). In the case of this method the precision of measurement is fundamentally determined by the time difference between the response time of the first transceiver device and the response time of the second transceiver device, which results in an error that is orders of magnitude smaller than the error of the there-and-back message sending method, however this method does not make it possible to perform high-precision distance measuring (within one centimetre) either.

It was recognised that a delay can be observed in the case of the transceiver device participating in the positioning during the transmission and receiving of the wave signal. In other words, there is a delay between the arrival of the wave signal and its detection, and between the generation of the response signal and its actual emission. Although of the order of nanoseconds, this delay causes a significant error in distance measurement due to the high speed of propagation of electromagnetic waves.

It was also recognised that the transmission and receipt delays always occur at the same time, never separately: in other words if the transceiver device only transmits, or only receives, then in this case when determining the time differences the transmission and receiving delays are eliminated. Therefore it is not necessary to separately examine the transmission and receiving delays, instead it is sufficient to determine their total.

It was also recognised that the precision of positioning can be significantly improved by determining the transmission and receipt delays belonging to the transceiver device participating in the positioning, and by correcting the time difference measured by the transceiver device with the transmission and receipt delay (by calibrating the transceiver device).

The objective of the invention is to provide a method and system serving for the calibration of a transceiver device with which the transmission and receipt delay of the transceiver device can be determined, and so improve the precision of the time measurement of the transceiver device.

The task was solved with the method according to claim 1 and with the system according to claim 7.

The individual preferable embodiments of the invention are specified in the subclaims.

Figure 2:
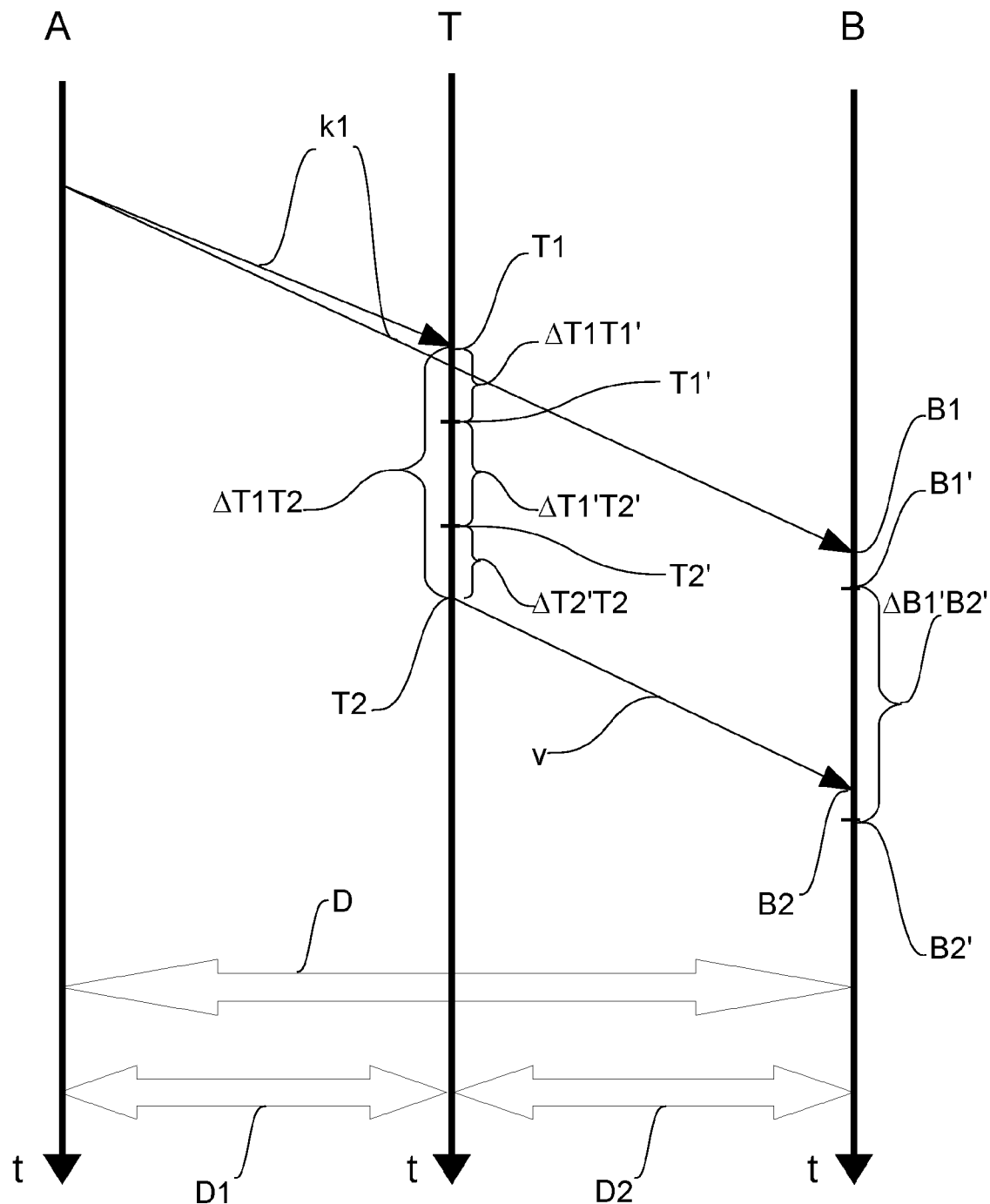
Figure 3:
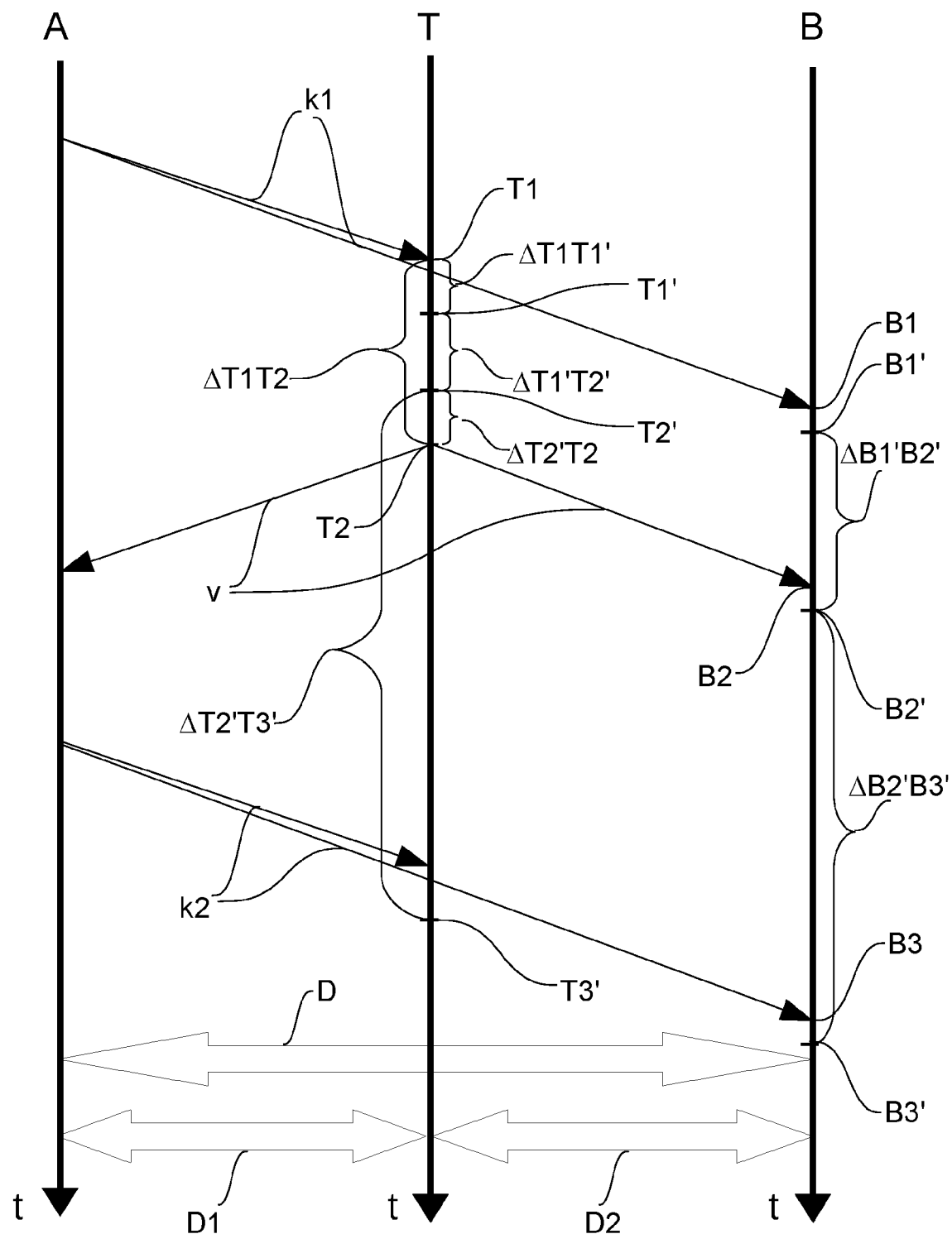

Further details of the invention will be explained by way of exemplary embodiments with reference to the figures, wherein:

FIG. 1 depicts a schematic view of the main elements participating in a possible embodiment of a method according to the invention, FIG. 2 depicts a flowchart of a possible embodiment of a method according to the invention, FIG. 3 depicts a flowchart of another possible embodiment of a method according to the invention.

FIG. 1 shows a schematic view of the main elements participating in a possible embodiment of the method according to the invention. In the case of the method according to the invention a transceiver device T is provided that is suitable for generating and emitting wave signals, as well as for detecting electromagnetic wave signals. In the course of the method a first calibration device A suitable for generating and emitting electromagnetic wave signals arranged at a known distance D1 from the transceiver device T, and a second calibration device B suitable for detecting electromagnetic wave signals arranged at a known distance D2 from the transceiver device and at a known distance D from the first calibration device A are also provided. In the context of the present invention detection of wave signals is understood to mean the time when the devices T, B detect the incoming wave signal. Due to the fact that the devices T, B have a finite operation speed, the moment of detection occurs delayed as compared to the actual moment when the wave signal arrives (receipt delay). Similarly, as a consequence of the finite operation speed of the devices T, A, the moment of generation of the wave signal, in other words when it is created, and the moment when the wave signal is actually emitted (broadcast) are not simultaneous. In other words, the wave signal is emitted after the moment in time registered by the T, A devices (transmission delay). It should be noted that as the wave signals propagate over time, this fact has to be taken into consideration when interpreting the moment in time, therefore, for example, the expressions wave signal generation or emission starting time, or, for example, wave signal generation or emission completion time are used.

The transceiver device T maybe any device capable of receiving and generating wave signals (such as a UWB transceiver, microcontroller supplied with a transceiver, or other dedicated hardware known of in itself) that is capable of measuring and processing the time passing between the detecting and generation of wave signals, and capable of forwarding the measured time data via cable or wireless technology.

The first calibration device A is the entirety of hardware and software elements that is capable of generating and emitting electromagnetic wave signals. The second calibration device B is an entirety of hardware and software elements that is capable of detecting electromagnetic wave signals, and capable of measuring the time passing between the detection of wave signals detected one after the other, and capable of forwarding the measured time data via cable or wireless technology. Optionally, an embodiment is conceivable in the case of which the first and second calibration devices A, B are established so as to be capable of generating and emitting electromagnetic wave signals and of detecting electromagnetic wave signals as well. In this case the first and second calibration devices A, B may even be established as devices that are the same as the transceiver device T. The advantage of this will be explained at a later stage.

In the case of a preferable embodiment of the method according to the invention a central IT unit 10 is provided that is connected by means of a digital communication channel 20 to the transceiver device T, and to at least the second calibration device B among the calibration devices A, B. A digital communication channel 20 may be established, for example, within the framework of digital communication network, which may be, for example, a wired and/or wireless local area network (LAN), or global information technology network, especially the Internet, a mobile telecommunication network operating on the basis of the 3G or 4G standard, a GSM network, a satellite communication network, etc., or a combination of these. The connection of the transceiver devices T and the calibration devices A, B with the central IT unit 10 naturally does not only mean a direct connection, but also include indirect connection, such as when the calibration device A, B is connected to the central IT unit 10 via another calibration device A, B or via a transceiver device T.

The wired data transfer connection may be implemented using the RS-485 standard, for example, and the wireless connection may be implemented, for example, using Bluetooth, ZigBee protocols, etc., as is obvious for a person skilled in the art. In the case of the present invention the central IT unit 10 is interpreted broadly, and includes any hardware and software device suitable for the receipt, storage, processing and transmitting of data, such as a desktop computer, laptop, system on chip, microcontroller, communication controller, mobile communications devices (smartphone, tablet), dedicated hardware, etc, as is known by a person skilled in the art.

In the first step of the method according to the invention a first calibration wave signal k1 is generated using the calibration device A, then the wave signal k1 is emitted. In the following, for the sake of clarity, the time of generating, emitting and detecting is understood to mean the starting moment of the generation, emitting and detecting of the wave signals. The wave signal k1 is preferable an electromagnetic wave, even more preferably an ultra-wideband radio signal, the central frequency and bandwidth of which is in the gigahertz range. Contrary to traditional, carrier modulated technologies short duration signals, in other words impulses are generated in the course of the use of ultra-wideband radio signals.

The wave signal k1 emitted by the first calibration device A reaches the transceiver device T arranged at a distance D1 from the device A at time instance T1. In the next step of the method according to the invention the wave signal k1 is detected by means of the transceiver device T at time instance T1' following time instance T1 by the time interval $\Delta T1T1'$, in other words by the reception delay. It should be noted that if the time of the generation or the emitting of the wave signals is understood to mean the starting moment in time of the generation or emitting, then the time of detection of the wave signal is understood to mean the starting moment of detection. In the course of the method according to the invention the wave signal k1 is detected by means of the second calibration device B at time instance B1'. It should be noted that as reception delay also occurs in the case of the device B, the wave signal k1 reaches the device B at time instance B1 preceding time instance B1'.

In the next step of the method a response wave signal v is generated with the transceiver device T at time instance T2' following time instance T1' by the time interval $\Delta T1'T2'$, and the response wave signal v is emitted at time instance T2 following time instance T2' by the time interval $\Delta T2'T2$, in other words by the transmission delay. The time interval $\Delta T1'T2'$ is determined with the transceiver device T. The determination of the time interval $\Delta T1'T2'$ is understood to mean either its direct measurement or, for example, its subsequent calculation on the basis of the separately stored moments in time instance T1' and T2'.

In the next step of the method the response wave signal v emitted at time instance T2 by the transceiver device T reaches the device B at time instance B2. The wave signal v is detected by means of the second calibration device B at time instance B2' following time instance B1' by the time interval $\Delta B1'B2'$. The determination of the time interval $\Delta B1'B2'$ may take place in accordance with that described in the case of the time interval $\Delta T1'T2'$, for example. Due to the fact that the transmission and receiving delays are essentially constant values characteristic of the given device, the value of the time interval $\Delta B1'B2'$ passing between the detections of the wave signals k1, v performed by the second calibration device B is the same as the value of the time interval passing between the actual arrival moments in time instances B1, B2 of the wave signals k1, v, except for that these time intervals are displaced in time as compared to each other by the receipt delay. In this way the receipt delay of the device B plays no role in the determination of the time interval ΔB1'B2', in other words the device B does not need to be calibrated (it is not necessary to know the value of the receipt delay of the device B).

Following the above steps the delay constant τ formed as the sum of the time intervals ΔT1T1' and ΔT2'T2 characteristic of the transceiver device T is determined on the basis of the distances D, D1, D2, the time intervals ΔB1'B2', ΔT1'T2' and the speed of propagation c of the wave signals using the following formula $$T = \Delta T1T1' + \Delta T2'T2 = \Delta B1'B2' - \Delta T1'T2' + \frac{D}{c} - \frac{D1}{c} - \frac{D2}{c}.$$

Finally the transceiver device is calibrated in such a way that the delay constant τ is added to the measured time interval ΔT1'T2'. Through this the time interval τ+ΔT1'T2' passing between the moment in time of the arrival of the first calibration wave signal k1 at the device T and the moment in time of the actual emitting of the response wave signal v can be determined. By calibrating the transceiver device T the precision of positioning based on the measurement of the propagation time of wave signals can be significantly improved. An already calibrated transceiver device T may also be set up in such a way that it automatically generates and emits a response signal in the case of the detection of a wave signal. In this case the time interval passing between the actual arrival of the wave signal and the actual emitting of the response wave signal is a predetermined and known value, therefore it is not necessary to measure this value separately.

The details of the determination of the delay constant τ are explained in the following. FIG. 2 shows the flowchart of a possible embodiment of the method according to the invention. The vertical axes depict the passing of time. It should be noted that FIG. 2 is a schematic view, which only serves for illustration, the transceiver device T and the devices A, B are not necessarily in the plane of FIG. 2. In the case of this embodiment the devices A, B are arranged at a known and preferably fixed distance D from each other. In the case of a possible embodiment the devices A, B are in an absolute reference system, for example they are secured to a building. The transceiver device T is preferably movable as compared to the devices A, B, however, during the implementation of the method its distance D1 as compared to the device A and its distance D2 as compared to the device B are known. For example, a fixed calibration point can be designated at the distances D1, D2 as compared to the devices A, B, and the transceiver device T to be calibrated is maintained at this fixed point in the course of the method.

The determination of the delay constant τ takes place in the following way. The values of the time intervals ΔT1'T2' and ΔB1'B2' and/or the data required to determine these (e.g. the values of the detection time instances T1', T2', B1', B2') are sent to the central IT unit 10 by means of the transceiver device T and the second calibration device B. In addition to the time intervals ΔT1'T2' and ΔB1'B2', identification data is also sent to the central IT unit 10, with the help of which it may be clearly determined which device T, B the time intervals originate from. Following this the delay constant τ is determined by means of the central IT unit 10 on the basis of the distances D, D1, D2, the speed of propagation c of the wave signals and the time intervals ΔB1'B2', ΔT1'T2'.

FIG. 3 depicts the flowchart of another, preferable embodiment of the method according to the invention. This embodiment differs from that presented above in that in this case the first calibration device A is established to be capable of both generating and emitting electromagnetic wave signals. After the first calibration wave signal k1 has been emitted a second calibration wave signal k2 is emitted by means of the first calibration device A, which is detected by the transceiver device T. Through this the error originating from the measurement of time is reduced, thereby enabling the calibration to be more precise. The steps of the method presented in FIG. 3 are as follows.

The response wave signal v emitted by the transceiver device T at time instance T2 is detected by means of the first calibration device A, then a second calibration wave signal k2 is emitted by means of the first calibration device A. The wave signal k2 emitted by the first calibration device A is detected by the transceiver device T at time instance T3'. Following this the time interval ΔT2'T3' passing between the time instances T2', T3' is determined, for example, in the way previously presented. The second calibration wave signal k2 reaches the device B at time instance B3, then the wave signal k2 is detected by means of the second calibration device B at time instance B3' following time instance B2' by the time interval ΔB2'B3' and the time interval ΔB2'l33' is determined. The delay constant τ formed as the sum of the time intervals ΔT1T1' and ΔT2'T2 is determined on the basis of the distances D, D1, D2, the time intervals ΔB1'B2', ΔT1'T2', ΔT2'T3', ΔB2'B3', and the speed of propagation c of the wave signals with the help of the following formula $$T = \Delta T1T1' + \Delta T2'T2 = \frac{\Delta B1'B2' - \Delta B2'B3'}{2} - \frac{\Delta T1'T2' - \Delta T2'T3'}{2} + \frac{D}{c} - \frac{D1}{c} - \frac{D2}{c}$$

It should be noted that although wave signals are both detected and emitted by the device A, the transmission and receipt delays of the device A do not have to be taken into consideration during the method according to the invention, as time differences are not measured with the device A. To put it another way, device A does not have to be calibrated.

In the case of a preferable embodiment the devices A, B, similarly to the transceiver device T, are established so as to be capable of generating and emitting electromagnetic wave signals, and also capable of detecting electromagnetic wave signals. In this way the devices A and B may be calibrated with the method according to the invention by the devices A, B and the transceiver device T swapping their roles. In other words, if the device A is to be calibrated, for example, the method according to the invention is implemented in such a way as if the device A were the transceiver device T, and the transceiver device T were the device A. Similarly, if the device B is to be calibrated, the method according to the invention is performed in such a way as if the device B were the transceiver device T, and the transceiver device T were the device B. Therefore, in the case of this embodiment by implementing the method according to the invention on all three of the devices T, A and B one after the other, the sums of the transmission and receipt delays may be determined for all three devices T, A, B, therefore each of the devices T, A, B may be calibrated.

The object of the invention also relates to a system 100 for the implementation of the method according to the invention. The system 100 contains a transceiver device T, a first calibration device A suitable for generating and emitting electromagnetic wave signals arranged at a distance D1 from the transceiver device T, and a second calibration device B suitable for detecting electromagnetic wave signals arranged at a distance D2 from the transceiver device T and at a distance D from the first calibration device A.

Preferably the system 100 also includes a central IT unit 10 in wired and/or wireless connection with the transceiver device T, and at least with the second calibration device B among the calibration devices A, B.

Various modifications to the above disclosed embodiments will be apparent to a person skilled in the art without departing from the scope of protection determined in the attached claims.

The invention claimed is:

1. Method for calibrating a transceiver device suitable for generating, emitting and detecting electromagnetic wave signals, characterised by
providing a first calibration device suitable for generating and emitting electromagnetic wave signals arranged at a distance D1 from the transceiver device, and
providing a second calibration device suitable for detecting electromagnetic wave signals arranged at a distance D2 from the transceiver device and at a distance D from the first calibration device,
emitting a first calibration wave signal using the first calibration device,
detecting the first calibration wave signal, reaching the transceiver device at time instance T1, by means of the transceiver device at time instance T1' following time instance T1 by a time interval $\Delta T1T1'$,
detecting the first calibration wave signal at time instance B1' by means of the second calibration device,
generating a response wave signal by means of the transceiver device at time instance T2' following time instance T1' by a time interval $\Delta T1'T2'$, and emitting the response wave signal at time instance T2 following the time instance T2' by a time interval $\Delta T2'T2$,
detecting the response wave signal, emitted by the transceiver device at the time instance T2, at time instance B2' following the time instance B1' by a time interval $\Delta B1'B2'$ by means of the second calibration device, then
determining a delay constant $\tau$ formed as a sum of the time intervals $\Delta T1T1'$ and $\Delta T2'T2$ on the basis of the distances D, D1, D2, the time intervals $\Delta B1'B2'$, $\Delta T1'T2'$ and the speed of propagation c of said wave signals using the formula $$T = \Delta T1T1' + \Delta T2'T2' = \Delta B1'B2' - \Delta T1'T2' + \frac{D}{c} - \frac{D1}{c} - \frac{D2}{c}$$

and adding the delay constant $\tau$ to the measured time interval $\Delta T1'T2'$.

2. Method according to claim 1, characterised by
providing a first calibration device for generating, emitting and also for detecting electromagnetic wave signals,
detecting a response wave signal emitted at the time instance T2 by the transceiver device by means of the first calibration device, then emitting a second calibration wave signal by means of the first calibration device,
detecting the second calibration wave signal, emitted by the first calibration device, at the time instance T3' by means of the transceiver device,
also detecting the second calibration wave signal at a time instance B3' following the time instance B2' by a time interval $\Delta B2'B3'$ by means of the second calibration device, then
determining a delay constant $\tau$ formed as a sum of the time intervals $\Delta T1T1'$ and $\Delta T2'T2$ on the basis of the distances D, D1, D2, the time intervals $\Delta B1'B2'$, $\Delta T1'T2'$, $\Delta T2'T3'$, $\Delta B2'B3'$ and the speed of propagation (c) of said wave signals using the formula $$T = \Delta T1T1' + \Delta T2'T2 = \frac{\Delta B1'B2' - \Delta B2'B3'}{2} - \frac{\Delta T1'T2' - \Delta T2'T3'}{2} + \frac{D}{c} - \frac{D1}{c} - \frac{D2}{c}.$$

3. Method according to claim 1, characterised by providing a central IT unit connected to the transceiver device and at least to the second calibration device among the first and second calibration devices by means of a digital communication channel, sending the values of the time intervals $\Delta B1'B2'$, $\Delta T1'T2'$ and/or the data required to determine them with the transceiver device and the second calibration device to the central IT unit via the digital communication channel, and determining the delay constant $\tau$ on the basis of the distances D, D1, D2, the speed of propagation c of said wave signals and the time intervals $\Delta B1'B2'$, $\Delta T1'T2'$ by means of the central IT unit.

4. Method according to claim 1, characterised by the said wave signals being ultra-wideband radio signals.

5. Method according to claim 4, wherein a central frequency and bandwidth of the ultra-wideband radio signals are in the gigahertz range.

6. Method according to claim 1, wherein the second calibration device is adapted to generate and emit electromagnetic wave signals, and also to detect electromagnetic wave signals.

7. A system for calibrating a transceiver device suitable for generating and emitting electromagnetic wave signals, and for detecting electromagnetic wave signals, which system contains a transceiver device, a first calibration device suitable for generating and emitting electromagnetic wave signals arranged at a distance D1 from the transceiver device, and a second calibration device suitable for detecting electromagnetic wave signals arranged at a distance D2 from the transceiver device and at a distance D from the first calibration device, characterised by that the transceiver device, and the first and second calibration devices are configured to be suitable for implementing the method according to claim 1.

8. The system according to claim 7, characterised by that it contains a central IT unit in wired and/or wireless connection with the transceiver device, and at least with the second calibration device.

* * * * *

UNITED STATES PATENT AND TRADEMARK OFFICE
CERTIFICATE OF CORRECTION

PATENT NO.          : 11,269,039 B2
APPLICATION NO.     : 16/645921
DATED               : March 8, 2022
INVENTOR(S)         : Andras Balogh et al.

It is certified that error appears in the above-identified patent and that said Letters Patent is hereby corrected as shown below:

In the Specification

Column 6, Line 23, the phrase:
"ΔB2'133' is determined."
Should read:
-- ΔB2'B3' is determined. --

In the Claims

Column 7, Line 50, Claim 1, the formula:

" $T = \Delta T1T1' + \Delta T2'T2' = \Delta B1'B2' - \Delta T1'T2' + \dfrac{D}{c} - \dfrac{D1}{c} - \dfrac{D2}{c}$ "

Should read:

-- $T = \Delta T1T1' + \Delta T2'T2 = \Delta B1'B2' - \Delta T1'T2' + \dfrac{D}{c} - \dfrac{D1}{c} - \dfrac{D2}{c}$ --

Signed and Sealed this
Thirty-first Day of May, 2022

*Katherine Kelly Vidal*
Katherine Kelly Vidal
*Director of the United States Patent and Trademark Office*